(12) United States Patent
Albert et al.

(10) Patent No.: US 9,636,892 B2
(45) Date of Patent: May 2, 2017

(54) THIN FLOOR TILES

(75) Inventors: Richard E. Albert, Richmond, VA (US); Keung Y. Choi, Syosset, NY (US)

(73) Assignee: DUBON ASSOCIATES, INC., Farmingdale, NY (US)

(*) Notice: Subject to any disclaimer, the term of this patent is extended or adjusted under 35 U.S.C. 154(b) by 250 days.

(21) Appl. No.: 13/114,873

(22) Filed: May 24, 2011

(65) Prior Publication Data

US 2012/0135203 A1  May 31, 2012

Related U.S. Application Data

(60) Provisional application No. 61/348,117, filed on May 25, 2010.

(51) Int. Cl.

| | | |
|---|---|---|
| *E04F 15/02* | (2006.01) | |
| *B32B 37/00* | (2006.01) | |
| *B32B 3/02* | (2006.01) | |
| *B32B 27/08* | (2006.01) | |
| *B32B 5/02* | (2006.01) | |
| *B32B 7/12* | (2006.01) | |
| *B32B 27/12* | (2006.01) | |
| *B32B 27/20* | (2006.01) | |
| *B32B 27/30* | (2006.01) | |
| *B32B 3/06* | (2006.01) | |
| *B32B 3/30* | (2006.01) | |

(52) U.S. Cl.
CPC ........... *B32B 27/08* (2013.01); *B32B 3/06* (2013.01); *B32B 3/30* (2013.01); *B32B 5/02* (2013.01); *B32B 7/12* (2013.01); *B32B 27/12* (2013.01); *B32B 27/20* (2013.01); *B32B 27/304* (2013.01); *E04F 15/02038* (2013.01); *B32B 2255/26* (2013.01); *B32B 2262/101* (2013.01); *B32B 2307/554* (2013.01); *B32B 2307/75* (2013.01); *B32B 2471/00* (2013.01); *Y10T 156/10* (2015.01); *Y10T 428/24777* (2015.01)

(58) Field of Classification Search
None
See application file for complete search history.

(56) References Cited

U.S. PATENT DOCUMENTS

| | | | |
|---|---|---|---|
| 2,030,556 A * | 2/1936 | Veltung | ........................... 52/318 |
| 5,073,425 A | 12/1991 | Dees et al. | |
| 5,230,945 A | 7/1993 | Dees et al. | |
| 6,440,543 B1 * | 8/2002 | Vieluf | ........................... 428/210 |

(Continued)

OTHER PUBLICATIONS

Machine Translation of JP 2005-314901.*

*Primary Examiner* — Gerard Higgins
*Assistant Examiner* — Sathavaram I Reddy
(74) *Attorney, Agent, or Firm* — Ware, Fressola, Maguire & Barber LLP (57) ABSTRACT

An article of manufacture which comprises a laminate flooring product, having at least one edge provided with one or more elements making it capable of interlocking with a reciprocally configured flooring product, and having a thickness of less than 4 mm, which product includes a plurality of component layers, a first one of said layers being a design layer, a second one being a backing layer, and a third one being a wear layer, said second and third layers being arranged respectively proximate opposite surfaces of said first layer; and a method of making said article of manufacture.

6 Claims, 3 Drawing Sheets

(56) References Cited

U.S. PATENT DOCUMENTS

| | | |
|---|---|---|
| 6,468,643 B1 | 10/2002 | Kanbayashi et al. |
| 6,933,043 B1 | 8/2005 | Son et al. |
| 2004/0003888 A1 | 1/2004 | Mott et al. |
| 2004/0086678 A1* | 5/2004 | Chen et al. .................. 428/44 |
| 2005/0048277 A1 | 3/2005 | Oshilaja et al. |
| 2006/0105189 A1 | 5/2006 | Park et al. |
| 2008/0138560 A1 | 6/2008 | Windmoller |
| 2009/0061168 A1 | 3/2009 | Kim et al. |

* cited by examiner

Figure 2

THIN FLOOR TILES

PRIORITY

The present application claims priority to U.S. Provisional Application No. 61/348,117 filed on May 25, 2010.

FIELD OF THE INVENTION

The present invention relates to flooring products, including but not limited to flooring panels such as floor tile comprising multiple component layers, including a design layer, a hacking layer and a wear layer, adapted such that adjacent units of flooring product are capable of interlocking with one another.

BACKGROUND OF THE INVENTION

There is increasing societal sensitivity to environmental issues, including minimization of the introduction of undesirable substances into the environment for the purposes of eliminating health concerns, preserving the integrity of the planet, and the film in that connection, there have been substantial efforts not only in the public sector, but also the private sector, to institute improved environmental practices. This has included the introduction of voluntary and sometimes mandatory standards by which the environmental friendliness of products in the marketplace can be judged. Products which meet such standards, and the commitment to furnishing same, are often referred to as "green" or "environmentally friendly". Indeed, it is considered very valuable to be qualified to apply such an appellation (or some equivalent) to products in commerce.

The flooring industry is not exempt from the phenomenon discussed in the preceding paragraph. Customarily, natural—and more recently synthetic polymeric—materials have been utilized to fashion flooring. However, the performance profile of flooring products so constituted has not been entirely satisfactory. To secure a more beneficial package of performance properties flooring products comprising multiple layers of varying materials have been introduced. Known as laminate flooring, products of this sort may contain a transparent or opaque wear layer disposed over a design layer which in turn is disposed over a support layer.

Furthermore, whether formed of natural, synthetic or laminate material(s), flooring products known in the art can feature interlocking elements, such as groove and tongue joints. These interlocking elements allow for easier installation of the flooring products since they do not require adhesive. Interlocking elements such as those described in U.S. Publication No. 2008/0138560 A1, EP 843,763 A1, EP 1,024,234 A1, EP 1,036,341 A1, EP 698,126 A1, U.S. Pat. No. 6,584,747, can be used in a variety of different flooring products. For example, a floor tile may contain an edge profile on at least two opposite edges in the form of a modified groove and tongue joint for the purpose of connecting adjacent tiles, with a coincident arrangement consisting of one groove and one tongue on each of at least two edges, of which the tongue on one edge of a first tile and the groove in an associated edge of a second tile rise obliquely upwards from the bottom of the tile.

As indicated, conventional laminate flooring provides several advantages over natural floor materials, such as lower cost, case of replacement, and lighter weight. Similarly, conventional laminate flooring confers one or more advantages over other conventional products made of synthetic materials, for instance, durability, wear-resistance and sound-damping capacity. More specifically, one aspect of laminate flooring which is particularly important is the thickness of the floor panel or tile. Traditionally, there has been a perception that thicker panels are superior to thinner panels. This stands to reason, as greater thickness confers advantages such as greater durability, and particularly sound damping capacity.

However, thicker panels have two important drawbacks, they require more material to produce, and they weigh more. These drawbacks disadvantageously affect the producer, the consumer, and the environment. That is to say, the producer is forced to purchase more material and transport heavier cargo (on a unit-by-unit basis in any event), which increase production and transportation costs. These costs are then passed on to the consumer in the form of higher floor panel prices.

In addition, thicker flooring products tend to frustrate compliance with governmental regulations designed to protect the environment. Thus, with thicker flooring products come environmental consequences. For example, the increased fuel consumption attendant upon transporting greater volumes and weight associated with thicker flooring products, has a negative impact on the environment. The foregoing is compounded by the fact that flooring products, such as laminate tiles, typically have at least one layer made from one or more polymers such as polyvinyl chloride, and thicker flooring products typically contain more of the polymer. Unfortunately, the disposal of such polymer can consume fossil fuels, increase landfill loads, and result in the release of undesirable substances. Thicker flooring tends to exacerbate the problems.

As already discussed, beyond government regulations, the prevalence of environmental concerns has given rise to the popularization of voluntary standards, compliance with which entitles one to publicize that fact for competitive advantage. For instance, the U.S. Green Building Council has established a Leadership in Energy and Environmental Design (LEED) rating system which sets forth scientifically based criteria for obtaining LEED credits based on a point system. Under the LEED rating system, a higher number of points are granted when a higher percentage of post-consumer (recycled) materials are used in new products. Products of conventional thickness can be insufficiently adapted to meeting sought-after standards.

Practice in the flooring area has been constrained by competing principles such as described. On the one hand, we are not aware of any teaching in the art of conventional non-laminate flooring product with the preferred performance profile regarding durability, wear-resistance and sound-damping capacity. On the other hand, laminate flooring products which have a preferable performance profile insofar as they exhibit relatively superior durability, wear-resistance or sound-damping capacity, are undesirably thick from an environmental standpoint. Thus, the current state of the art provides for laminate flooring thicknesses of approximately 7-14 mm. See, for example, the following manufacturers and products: Armstrong™ product, 12 mm (http://www.armstronng.com/flooring/laminate/afzelia-wood-plank-1.3030/floor-105302.asp); "floorstoyourhome.com" left hand column, 8-11.3 mm (http://www.floorstoyourhome.com/category/51/tile-laminate-flooring.cfm); "builddirect.com", 7-14 mm (http://www.builddirect.com/Laminate-Flooring.aspx); Mannington™ product, 12.7 mm (http://www.mannington.com/Residential/Laminate/Diamond%20Bay/Hawaiian%20Koa/26800.aspx).

A more aggressive claim is made in U.S. Publication No. 2008/0138560 A1 (the "560 Publication"). page 1, paragraph 16, which purports to enable products with thickness down to 4 mm, but even that reference indicates a satisfactory laminate tile cannot be produced with a thickness under 4 mm. More specifically, it is taught that "the inventive panel should be thicker than the conventional elastic floor panels . . . [and the] thickness should be 4 to 8 mm".

A significant practical problem is that simply minimizing the amount of environmentally undesirable substances is insufficient. Instead, the "greening" of products would preferably be achieved without undue loss of performance in providing protection for surfaces which they are utilized to cover. For instance, the MPI Green Performance standard "therefore requires that all products shall meet or exceed the performance requirements of the applicable MPI product standard." The point is that "greening" should, to the extent possible, nut entail sacrificing properties which are conventionally taken as characterizing proper product performance.

Achieving the dual objectives of "greening" laminate flooring products while maintaining good performance is a challenging proposition. From the art, one of ordinary skill would have deduced that the thinning of flooring panels in accordance with "green" principles commonly leads to degradation of at least one important property (and often more than one) such as sound-damping capacity. More specifically, in our experience flooring-product performance can be characterized by: constituent material mass and weight ease of replacement; durability; wear-resistance; sound-damping capacity; and cost. Were a laminate flooring product to be "greened" by decreasing its thickness, the diminution of one or more of those properties would have been expected. This is especially so in view of the clear teaching in the 560 Publication away from a panel of thickness less than 4 mm.

But, a thinner product, if attainable, could mitigate anticipated compromise of the environment. Furthermore, the 560 Publication does not provide any indication to one skilled in the art of the realization of superior performance at thickness of less than 4 mm, not to mention how such a tile could be produced with satisfactory quality.

It would be a substantial advance in the art if a laminate flooring product exhibiting the desired performance profile and also being of thickness less than 4 mm, so as to be environmentally friendly, could be achieved.

SUMMARY OF THE INVENTION

In view of the foregoing, it is an object of the invention to provide an environmentally friendly laminate flooring product comprising interlocking units.

It is a further object of the invention to provide an environmentally friendly laminate flooring product comprising interlocking units, with a thickness of less than 4 mm produced using less material per unit or product than with a conventional laminate flooring product.

It is another object of the invention to provide a flooring product comprising advantageously light-weight interlocking units so as to reduce the costs and environmental impact associated with transporting the product.

It is yet another object of the invention to provide an environmentally friendly laminate flooring product comprising light-weight interlocking units, which product has a substantial amount of constituent recycled material in order to reduce any negative environmental impact.

It is still another object of the invention to provide a flooring product comprising light-weight interlocking units which exhibits structural integrity (or durability) and an ability to withstand wear over time.

It is an even further object of the invention to provide a method of making such a flooring product.

These and other objects are attained through practice of the invention as follows.

In a first aspect the present invention is directed to an article of manufacture which comprises a laminate flooring panel, having at least one edge provided with one or more elements making it capable of interlocking with a reciprocally configured flooring panel, and having a thickness of less than 4 mm, which panel includes a plurality of component layers, a first one of said layers being a design layer, a second one being a backing layer, and a third one being a wear layer, said second and third layers being arranged respectively proximate opposite surfaces of said first layer.

In another aspect the present invention is directed to a method of making a flooring panel which comprises laminating a plurality of component layers into a construct of thickness less than 4 mm, a first one of said layers being a design layer, a second one being a backing layer, and a third one being a wear layer, said construct being formed such that the second and third layers are arranged respectively proximate to opposite surfaces of said first layer, and providing at least one edge of said flooring panel with one or more elements capable of interlocking with a reciprocally configured edge of another flooring panel.

Additional layers can be used, such as a protective coat layer placed on top of the wear layer, a balance layer used to compensate for the natural curving and bowing of other layers, and stabilizing layers used to provide structural integrity.

The present invention has many benefits over the current state of the art such as lower production costs, lower shipping costs, smaller environmental footprint, easier handling, while having no or negligible disadvantages. These advantages of the present invention will become more apparent upon reading the following detailed description in conjunction with the accompanying drawings.

More specifically, practice of the invention confers substantial advantages. With the invention not only are production costs and shipping costs reduced and the ease of handling enhanced, due to decreased mass and weight per unit of flooring product, but also the environmental footprint of shipping and handling operations, as well as the amount of waste generated and needing to be disposed, are reduced. As a consequence, the inventive flooring product can meet the requirements of various government and industry standards for environmental friendliness in ways unrealizable with conventional technology. This is significant because it can lead to an entitlement to designate products of the invention as "green" and/or environmentally friendly, in accordance with various standards referred to in the preceding "Background" section, as well as in accordance with the FPA's definition of Hazardous Air Pollutants ("HAPS").

However and this is integral to our invention—the mitigation of environmentally undesirable effects is not accompanied by an appreciable fall-off of the good performance characteristics already identified by us, namely such key properties and parameters as decreased mass and weight; ease of replacement; durability; wear-resistance; sound-damping capacity; and cost. Rather, a strong performance contour is maintained in respect of those properties collectively. This means that improvement on the environmental front is achieved without materially degrading performance as to any of the key properties discussed previously, which is contrary to what conventional thinking would have suggested and therefore is a result that would have been unexpected by practitioners in the field at the time of our invention.

DETAILED DESCRIPTION OF CERTAIN PREFERRED EMBODIMENTS

A central aspect of the invention is the discovery of en environmentally friendly flooring product. As a consequence of the reduced thickness of the innovative flooring product (typically in the form of a panel) there is enabled the substantial mitigation of undesirable environmental effects attendant upon use of conventional laminate flooring products, with concomitant maintenance of high-level performance concerning one or more of the aforementioned key properties and parameters. Per the "Background of the Invention" section, conventional laminate flooring panels are typically or thickness 7-14 mm. While there is teaching of an interlocking laminate flooring panel with thickness ostensibly as low as 4 mm, this appears to be a dubious proposition, as we understand that the technology for which such claim is made docs not reliably yield product with acceptable performance at such a thickness. In any event, the reference which discloses such technology indicates that a thickness of 4 mm is the best which can be achieved, and that lesser thicknesses are beyond its teaching. However, with our invention thicknesses or less than 4 mm, for example no more than 3.9 mm, are attainable and with those thicknesses both good performance and mitigated environmental impact. This includes a preferred thickness of from 2-3.9 mm, and an especially preferred thickness of from 2.5-3.5 mm, and more especially 3 mm. In other good embodiments of the invention, a preferred thickness is no more than 2.5 mm, especially no more than 2 mm. And, the flooring product can under certain circumstances be of thickness as little as 0.5 mm (though its durability. i.e., structural integrity, or strength, may be reduced to some extent in such instance). This runs counter to the conventional wisdom mentioned above concerning interlocking floor panels, and attainment of desirably low thicknesses with practice of the invention would not have been obvious at the time of its making.

An important feature of the invention is its potential for environmental friendliness. One way of complying with government regulations is formulation of some portion of the inventive panels from recycled polyvinyl chloride products or other such flooring design polymers, to reduce introduction of undesirable substances into the environment, and also to lessen the load on landfills. It follows that flooring products made with recycled polyvinyl chloride or other such polymers are preferred to flooring products using non-recycled materials. By the same token, flooring products using a high percentage of post-consumer materials should help in attaining a high score according to the LEED rating system. This can be favorably promoted as indicative of a "greener" flooring product. For example, polyvinyl chloride flooring that has been thrown away can be reused by being melted and combined with fillers and plasticizers to form a material which can be incorporated in the inventive flooring panels for the purpose of securing environmental benefits as previously discussed. Of course, other ways in which our innovative flooring product is environmentally friendly are that (i) the reduced mass and weight per unit of product indicates the reduced incorporation of polyvinyl-chloride, or other flooring design polymer(s) and thus the reduced introduction of such polymer(s), even without recycling, into landfill facilities and the like, as well as (ii) such reduced mass and weight mean lower material requirements and greater efficiency in production transport and handling operations with a concomitant decrease in power expended, fuel utilized, and emissions into the environment generated in connection with those operations.

The aforementioned design layer, backing layer and wear layer are essential components of the invention. They are now described in greater detail with reference to the figures of drawing. The individual layer thicknesses described hereinafter are intended to be illustrative and not limiting.

In advantageous embodiments, the product and method of our invention are such that the wear layer and the backing layer are adjoined, directly or through one or more intermediate layers, respectively, to opposite surfaces of the design layer. The intermediate layers can include one or more of a balance layer, an embossing layer, and first and second stabilizing layers.

Frequently, the wear layer is adjoined directly to a surface of the design layer, with a protective layer on the surface of the wear layer opposite that adjoined to the design layer, and the backing layer is adjoined to an opposite surface of thy design layer through intermediate layers comprising said second stabilizing layer, said balance layer, said first stabilizing layer, and said embossing layer, either in that order or a different one, its being understood that the intermediate layers are optional and that any one or more of them can be omitted.

Figure 1:
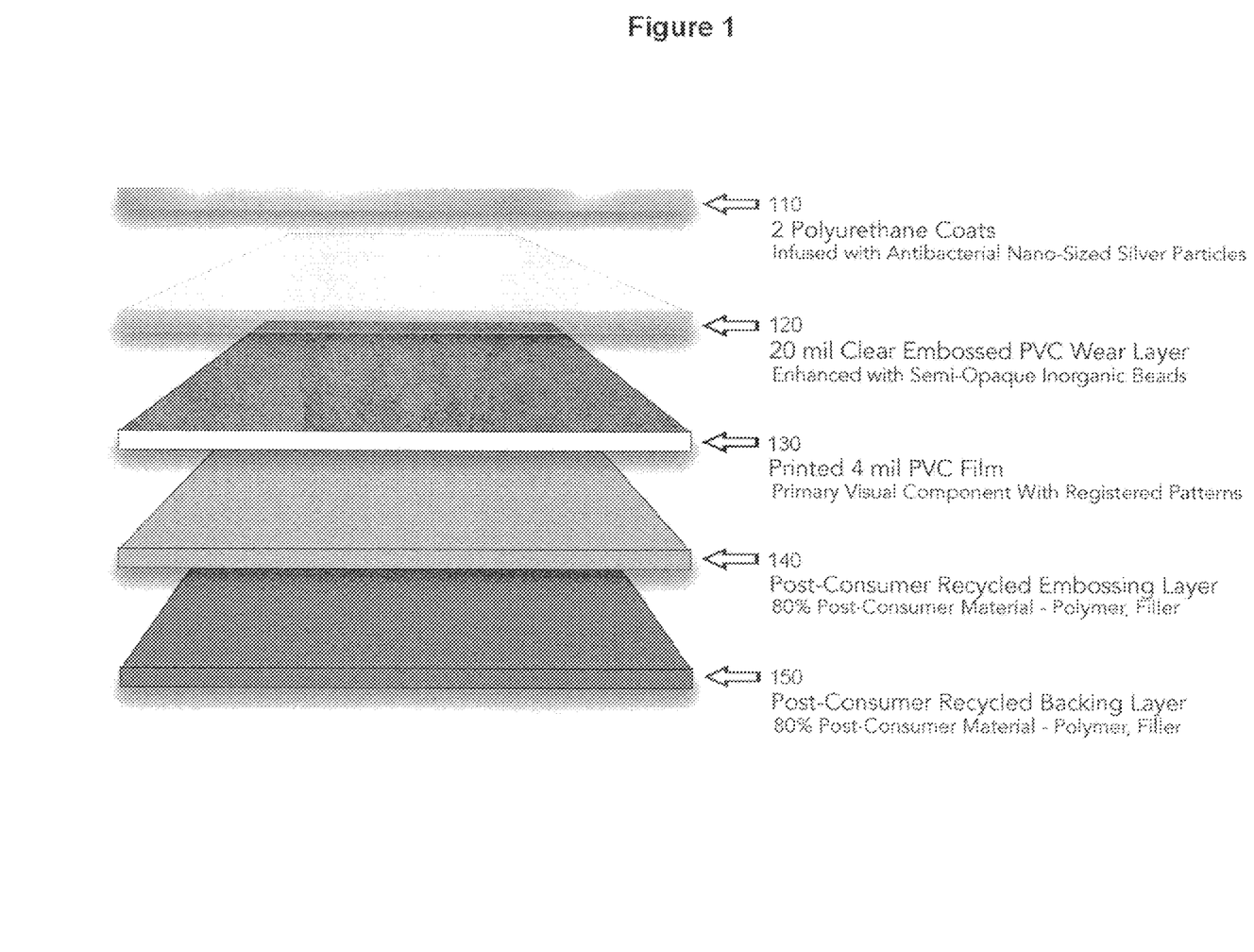
FIG. 1 is an exploded perspective view of a cross-section of a five-layer laminate panel in accordance with the invention.

In an inventive embodiment illustrated in FIG. 1, there are five layers. From top to bottom, they are: a protective coat layer, a wear layer, a design layer, an embossing layer, and a backing layer. These layers are respectively elements 110, 120, 130, 140 and 150 in FIG. 1. The design, wear and backing layers are as discussed previously herein.

Protective coat layer 110 functions as the primary mechanism for creating sheen along with acting as a first-line barrier against wear. The protective coat layer may be adjusted to provide for different sheens, such as high gloss or low gloss. In a preferred embodiment, the protective coat layer comprises a polyurethane coat. Polyurethane is very inert, and therefore resists reaction with body fluids and other organic and inorganic chemicals. Polyurethane is also an ideal coating for floor material because it can be made to have a scratch and abrasion resistant surface. In one embodiment, the polyurethane coat is infused with antibacterial nano-sized silver particles ("nano-silver"). Nano-silver is an anti-microbial agent that provides an inert germ-killing surface to the flooring. Due to the component particles' minute size, they are invisible to the human eye. In a preferred embodiment, the protective coat has a pre-production thickness of approximately 0.085-0.115 mm. In another embodiment, the protective coat has a pre-production thickness of less than 0.144 mm.

Design layer 130 provides the primary visual component of the floor tile. The layer is polyvinyl chloride or other flooring design polymer, and is typically in the form of imprinted film or otherwise decorated with suitable adornment to give the flooring a desired appearance, such us a wood design. It is generally located under the transparent wear layer so that the primary visual displayed is the adornment on the design layer. In a preferred embodiment, the adornment is printed on a polyvinyl chloride film, such as a 4 mil polyvinyl film, and is located directly beneath the wear layer. In one alternative, the design is printed in rotogravure fashion using 2-3 cylinders. In another alternative, the design is printed in rotogravure fashion using 4-5 cylinders to provide a better depth of color and higher contrast. In a preferred embodiment, the design layer has a pre-production thickness of approximately 0.05-0.13 mm. In another embodiment, the design layer has a pre-production thickness of less than 0.16 mm.

Wear layer 120 is the primary protective layer and is located above the printed polyvinyl chloride film or other flooring design polymer. Although the protective coat layer initially provides shielding, it generally wears away after use. The wear layer provides long-form wear-resistance that guards against damage to the design layer. In a preferred embodiment, wear layer 120 is comprised of transparent polyvinyl chloride and is located beneath the protective coat layer. The transparency of wear layer 120 allows the design layer to be seen through the wear layer. The wear layer may include inorganic beads, known as microceramics, in order to increase the layer's scratch and scuff resistance. Additionally, the wear layer may also be embossed to provide texture and a more realistic visual. For example, the embossing may help simulate the grain in wood. In a preferred embodiment, the wear layer has a post-production thickness of approximately 0.45-0.55 mm. In another embodiment, the wear layer has a post-production thickness of less than 0.688 mm.

Embossing layer 140 helps provide a more realistic visual, for example, by adding the appearance of texture. In a preferred embodiment, embossing layer 140 is comprised of polyvinyl chloride and is located directly beneath design layer 130. This polyvinyl chloride may comprise, in part or whole, recycled polyvinyl chloride, or other recycled products. In one example, the embossing layer will be comprised of approximately 80% post-consumer recycled material. In an exemplary embodiment, when wear layer 120 contains embossing, the embossing layer has embossing that is not as fine as the wear layer's embossing, or the details or which are not as sharp. When the wear layer has embossing, that embossing is used to create more subtle looks, such as simulating antiquated wood that has been chipped. Such an effect cannot be adequately produced with only one embossed layer. In a preferred embodiment, if the flooring panel does not contain a discrete balancing layer (as described hereinafter), embossing layer 140 also provides the function of a balancing layer. In one embodiment, when the flooring panel does contain a discrete balance layer, embossing layer 140 has a pre-production thickness of approximately 0.95-1.05 mm. In another embodiment, when the flooring panel does contain a discrete balance layer, embossing layer 140 has a pre-production thickness of less than 1.31 mm. In another embodiment, when the flooring panel does not contain a discrete balance layer, embossing layer 140 has a pre-production thickness of approximately 2.25-2.35 mm. In another embodiment, when the flooring panel does not contain a discrete balance layer, embossing layer 140 has a pre-production thickness of less than 2.94 min.

Backing layer 150 underlies the design layer, usually is the bottom-most layer, and provides balance for deformations or pressure to the wear layer. The backing layer is the least porous layer, and this decreased permeability precludes liquids from entering the tile from below. In a preferred embodiment, the backing layer is comprised of polyvinyl chloride, and the polyvinyl chloride concentration of this layer is higher than the other layers. This polyvinyl chloride may comprise, in part or whole, recycled polyvinyl chloride, or other recycled products. In an exemplary embodiment, the backing layer will be comprised of approximately 80% post-consumer recycled material. In yet another preferred embodiment, backing layer 150 has a pre-production thickness or approximately 0.95.1.05 mm. In another embodiment, the backing layer has a pre-production thickness of less than 1.31 mm.

Figure 2:
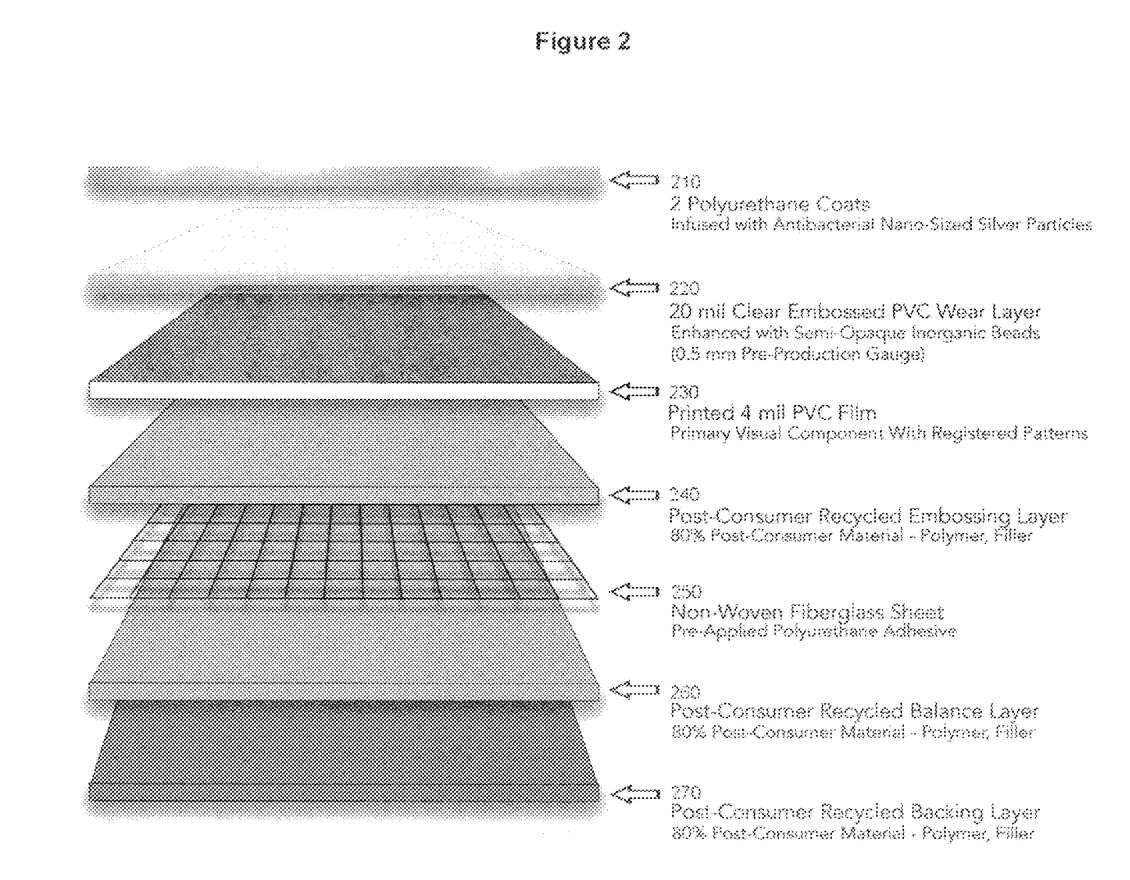
FIG. 2 is an exploded perspective view of a cross-section of a seven-layer laminate panel in accordance with the invention.

In another inventive embodiment illustrated in FIG. 2, there are seven layers. From top to bottom, they are: a protective coat layer, a wear layer, a design layer, an embossing layer, a stabilizing layer, a balance layer, and a backing layer. These layers are respectively elements 210, 220, 230, 240, 250, 260 and 270 in FIG. 2. The design, wear, hacking, protective coat, and embossing layers are as discussed previously herein.

Stabilizing layer 250 provides structural integrity to the flooring panel. The stability provided by the stabilizing layer is particularly important when thermoplastic polymers, such as polyvinyl chlorides, are used since thermoplastic polymers tend to contract and expand depending on the temperature. In a preferred embodiment, stabilizing layer 250 comprises strands of fiberglass formed into a sheet and mixed with polyurethane. The fiberglass provides a stable material that is not reactive to temperature and non-biodegradable. The polyurethane provides an adhesive to keep the flooring panel laminated securely. Stabilizing layer 250 may be placed anywhere between the embossing layer and the backing layer. In a preferred embodiment, the stabilizing layer has a pre-production thickness of approximately 0.25-0.35 mm. In another embodiment, the stabilizing layer has a pre-production thickness of less than 0.53 mm.

Balance layer 260 helps stabilize the entire flooring panel by balancing the curving and bowing of the other layers of the panel. For example, if the top layer is bowing outward, balance layer 260 will help reduce the outward bowing of the top layer. In a preferred embodiment, balance layer 260 is comprised of polyvinyl chloride, along with plasticizer and filler, with the proportion(s) of polyvinyl chloride to plasticizer to filler being adjusted based on the curving and bowing properties of the other layers. This polyvinyl chloride may comprise, in part or whole, recycled polyvinyl chloride, or other recycled products. In an exemplary embodiment, the balance layer will be comprised of approximately 80% post-consumer recycled material. Balance layer 260 may be placed anywhere between embossing layer 240 and backing layer 270. In a preferred embodiment, balance layer 260 has a pre-production thickness of approximately 0.95-1.05 mm. In another embodiment, balance layer 260 has a pre-production thickness of less than 1.31 mm.

Figure 3:
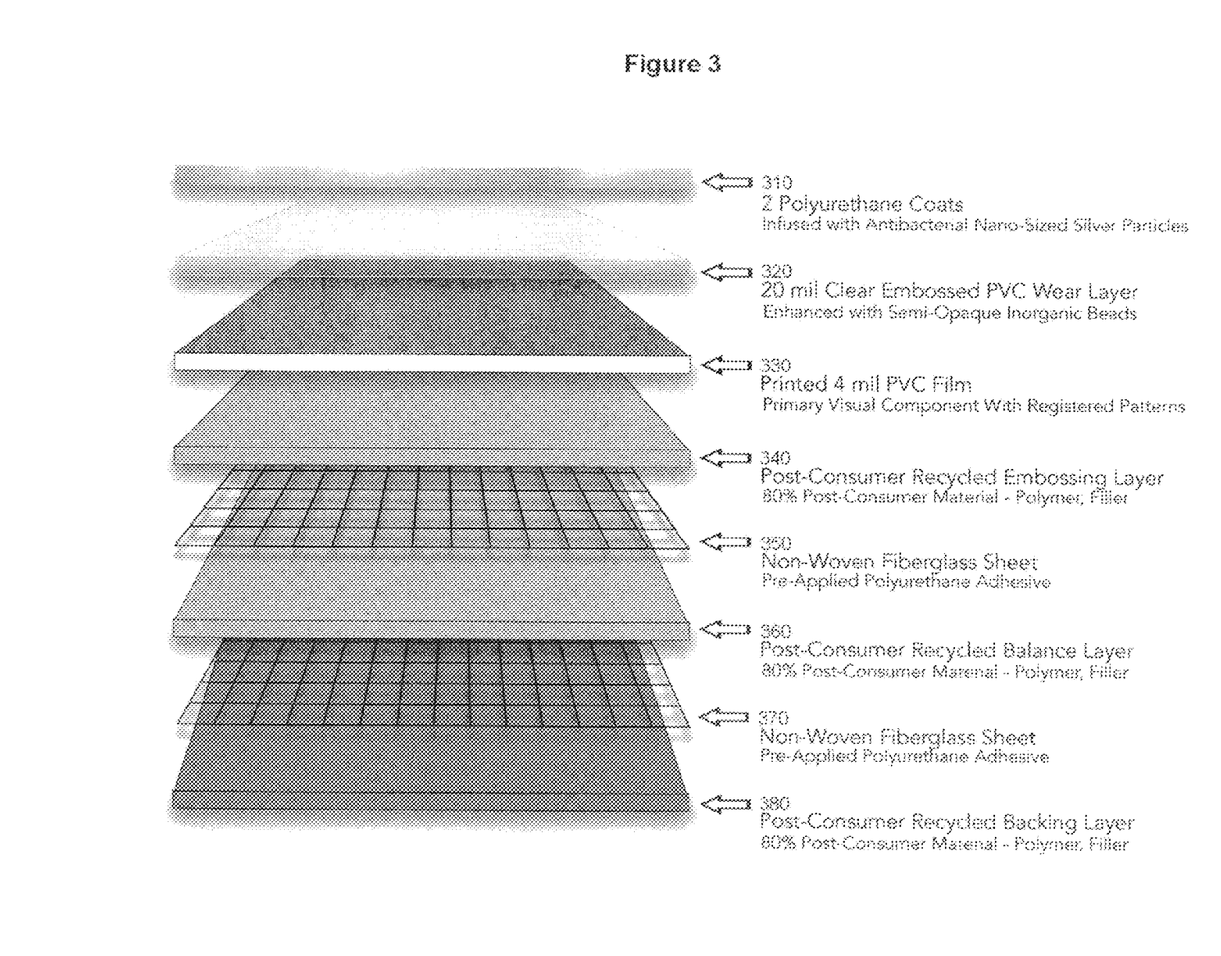
FIG. 3 is an exploded perspective view of a cross-section of an eight-layer laminate panel in accordance with the invention.

In still another inventive embodiment illustrated in FIG. 3, there are eight layers. From top to bottom, they are: a protective coat layer, a wear layer, a design layer, an embossing layer, a stabilizing layer, a balance layer, a second stabilizing layer, and a backing layer. These layers are respectively elements 310, 320, 330, 340, 350, 360, 370 and 380 in FIG. 3. The design, wear, backing, protective coat, embossing, stabilizing, and balance layers are as discussed previously herein.

Second stabilizing layer 370 is identical in character and function to initial stabilizing layer 350 (along the lines already described). In one example, stabilizing layer 350 is placed between embossing layer 340 and balance layer 360, and second stabilizing layer 350 is placed between balance layer 360 and backing layer 380. The use of two stabilizing layers helps deliver additional structural support throughout the flooring panel.

It will be appreciated that, in the context of the invention, a "layer" is "proximate" one surface or another of the "design layer" of our laminate floor panel if it is close or near to—though not necessarily immediately adjacent—the design layer. There can be one or more other layers interposed between the "layer" in question and the "design layer", as depicted in the figures of drawing included herein. As is further clear from the figures of drawing, a layer "proximate" one surface of the design layer is closer to that surface of the design layer that it is to the opposite surface of the design layer. The wear layer and the backing layer are each "proximate" its corresponding surface of the design layer since the thickness of a flooring product pursuant to our invention is on the order of one to a few millimeters, and typically less than 4 mm.

The flooring product of our invention can be made by a method qualitatively like that disclosed in the 560 Publication, but with an important and substantially differentiating exception. That is to say, while heat and pressure are applied to an assemblage of component materials (with all or at least some being typically in layer form, ordered in a sequence corresponding to that they will have in the finished flooring product) in a generally similar fashion vis-a-vis conventional laminates, they are applied correlatively such that the post-production thickness is less than 4 mm. In certain advantageous embodiments, heat and pressure are correlatively applied so that a post-production thickness, both in the overall and on a layer-by-layer basis, is achieved in accordance with the discussion of preferences in preceding passages. Because the thickness of individual precursor component material layers or other deposits can vary from one embodiment to another, differing amounts of heat and pressure will need to be applied respectively to the combinations of different embodiments in order to attain a desired thickness less than 4 mm. However, once in possession of the teachings herein, those of ordinary skill in the art will be able by routine and empirical extrapolation, without experimentation rising to the level of further invention, to determine the appropriate conditions for treating the precursor assemblage to yield the flooring product of the invention. It goes almost without saying that the application of heat and pressure is desirably sufficient to secure the laminate product and performance properties sought, but advantageously is restricted so that, either the heat or pressure by itself or in combination with one or more other prevailing conditions, is not of an extent or a duration so as to damage any of the precursor materials whereby the flooring product or any of its properties sought is materially compromised. The pre-production thickness of each layer will decrease when the layers are laminated together. Thus, the overall post-production thickness of the flooring panel is often less than the sum of the pre-production layer thicknesses. The percentage of the overall thickness reduction depends on the amounts of pressure and heat that are used, but is typically from 4-25%. In any event, the correlative amounts of heat and pressure utilized to decrease thickness below 4 mm will in their aggregate effect exceed the aggregate effect of the correlative amounts of heat and pressure needed to secure a thickness of 4 mm or greater when applied to comparable (i.e., normalized) precursor assemblages.

As described above, a number of different systems may be used to create interlocking connections for the flooring products of the present invention, such as a groove and tongue system. For example, and not by way of limitation, the interconnection systems described in the 560 Publication, EP 843,763 A1, EP 1,024,234 A1, EP 1,036,341 A1, EP 698,126 A1, and U.S. Pat. No. 6,584,747, may be used in conjunction with the present invention.

Accordingly, as described above, various embodiments of an interlockable laminate flooring panel comprising multiple layers with a post-production thickness of less than 4 mm, while maintaining quality and structural integrity, are provided.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

What is claimed is:

1. An interlockable flooring product in the form of a multilayered laminate, comprising:
   a protective coat layer;
   a wear layer;
   a design layer;
   an embossing layer; and
   a backing layer;
said protective coat layer being deposited on a surface of said wear layer, with an opposite surface of the wear layer being adjoined, directly or through one or more intermediate layers, to a surface of the design layer, and said backing layer being adjoined, through one or more intermediate layers including at least the embossing layer, to an opposite surface of the design layer, said backing layer precluding liquid from entering the flooring product from underneath, and said interlockable flooring product having a thickness of less than 4 mm and further having at least one edge provided with one or more elements capable of interlocking with a reciprocally configured edge of another flooring product.

2. The interlockable flooring product as defined in claim 1, wherein the protective coat layer is disposed on a surface of a wear layer opposite that adjoined with the designed layer, and the backing layer is adjoined with the design layer through the embossing layer.

3. The interlockable flooring product as defined in claim 1, which further comprises a balance layer, and a stabilizing layer, the backing layer being adjoined with the balance layer, which balance layer is adjoined with the embossing layer, and which embossing, layer is in turn adjoined with the design layer, said interlockable flooring product having a thickness of from at least 2 to less than 4 mm.

4. The interlockable flooring product as defined in claim 1, which further comprises a balance layer, a first stabilizing layer and a second stabilizing layer, the backing layer being adjoined with the second stabilizing layer, the second stabilizing layer being adjoined with the balance layer, the balance layer being adjoined with the first stabilizing layer, the first stabilizing layer being adjoined with the embossing layer, and the embossing layer being adjoined with the design layer, said interlockable flooring product having a thickness of from at least 3 to less than 4 mm.

5. An interlockable flooring product in the form of a multilayer laminate, comprising:

a protective coat layer;
a wear layer;
a design layer;
an embossing layer; and
a backing layer;
said protective coat layer being deposited on a surface of said wear layer, with an opposite surface of the wear layer being adjoined, directly or through one or more intermediate layers, to a surface of the design layer, and said backing layer being adjoined, through one or more intermediate layers including at least the embossing layer, to an opposite surface of the design layer and precluding liquid from entering the flooring product from underneath, said interlockable flooring product having a thickness of no more than 2.5 mm and further having at least one edge provided with one or more elements capable of interlocking with a reciprocally configured edge of another flooring product.

6. An interlockable flooring product in the form of a multilayer laminate, comprising:
a protective coat layer;
a wear layer;
a design layer;
an embossing layer; and
a backing layer;
said protective coat layer being deposited on a surface of said wear layer, with an opposite surface of the wear layer being adjoined, directly or through one or more intermediate layers, to a surface of the design layer, and said backing layer being adjoined, through one or more intermediate layers including at least the embossing layer, to an opposite surface of the design layer and precluding liquid from entering the flooring product from underneath, said interlockable flooring product having a thickness of no more than 2 mm and further having at least one edge provided with one or more elements capable of interlocking with a reciprocally configured edge of another flooring product.

* * * * *